United States Patent
Kagawa et al.

(10) Patent No.: US 8,369,993 B2
(45) Date of Patent: Feb. 5, 2013

(54) METHOD AND APPARATUS FOR CALIBRATING POSITION AND ATTITUDE OF ARM TIP OF ROBOT

(75) Inventors: Naoya Kagawa, Kariya (JP); Tetsuya Sato, Anjo (JP)

(73) Assignee: Denso Wave Incorporated, Tokyo (JP)

( * ) Notice: Subject to any disclaimer, the term of this patent is extended or adjusted under 35 U.S.C. 154(b) by 309 days.

(21) Appl. No.: 12/654,412

(22) Filed: Dec. 18, 2009

(65) Prior Publication Data
US 2010/0168915 A1    Jul. 1, 2010

(30) Foreign Application Priority Data
Dec. 18, 2008 (JP) ................ 2008-322342

(51) Int. Cl.
*G06F 19/00* (2006.01)
(52) U.S. Cl. ..................................... 700/263
(58) Field of Classification Search ........... 701/245–264
See application file for complete search history.

(56) References Cited

U.S. PATENT DOCUMENTS

| | | | |
|---|---|---|---|
| 4,763,276 A * | 8/1988 | Perreirra et al. | 700/262 |
| 5,023,808 A * | 6/1991 | Seraji | 700/248 |
| 5,430,643 A * | 7/1995 | Seraji | 700/263 |
| 5,523,663 A * | 6/1996 | Tsuge et al. | 318/568.16 |
| 5,579,442 A * | 11/1996 | Kimoto et al. | 700/246 |
| 5,737,500 A * | 4/1998 | Seraji et al. | 700/251 |
| 6,304,050 B1 * | 10/2001 | Skaar et al. | 318/568.11 |
| 6,786,896 B1 * | 9/2004 | Madhani et al. | 606/1 |
| 6,845,295 B2 * | 1/2005 | Cheng et al. | 700/245 |
| 7,558,647 B2 * | 7/2009 | Okazaki | 700/260 |
| 7,623,944 B2 * | 11/2009 | Dariush | 700/245 |
| 7,684,896 B2 * | 3/2010 | Dariush | 700/245 |
| 7,751,938 B2 * | 7/2010 | Tsusaka et al. | 700/250 |
| 2005/0038563 A1 * | 2/2005 | Rauf et al. | 700/245 |
| 2007/0288124 A1 * | 12/2007 | Nagata et al. | 700/258 |
| 2008/0010706 A1 * | 1/2008 | Moses et al. | 901/8 |
| 2008/0188986 A1 * | 8/2008 | Hoppe | 700/263 |

FOREIGN PATENT DOCUMENTS

| | | |
|---|---|---|
| JP | A 7-068480 | 3/1995 |
| JP | B2 2640339 | 8/1997 |
| JP | A 2006-110705 | 4/2006 |

\* cited by examiner

*Primary Examiner* — James Trammell
*Assistant Examiner* — Truc M Do
(74) *Attorney, Agent, or Firm* — Oliff & Berridge, Plc

(57) ABSTRACT

A calibrating technique is provided for the position/attitude or only the position of an arm tip of a robot, such as an articulated type of robot. At plural positions, respective n pieces of errors ($\Delta\phi_n$, wherein n is a positive integer larger than a value obtained by dividing the number of unknown parameters by 6 or 3) are calculated. Each error is a difference between a position of the arm tip measured and a position commanded by control. An inter-error difference ($\Delta\epsilon_y$ ($1 \leq y \leq n-1$)) between a reference error ($\Delta\phi_m$ ($1 \leq m \leq n$)) arbitrarily selected from the n-piece errors ($\Delta\phi_n$) and other errors ($\Delta\phi_x$ ($x \leq n$, except for m)) other than the reference error ($\Delta\phi_m$) is calculated. A parameter, which is a basis for calculating the inter-error differences ($\Delta\epsilon_y$), is made to converge until a sum of absolute values of the inter-error differences ($\Delta\epsilon_y$) becomes within a given threshold ($\epsilon_0$ ($\epsilon_0 > 0$)).

8 Claims, 5 Drawing Sheets

METHOD AND APPARATUS FOR CALIBRATING POSITION AND ATTITUDE OF ARM TIP OF ROBOT

CROSS-REFERENCE TO RELATED APPLICATION

This application is based on and claims the benefit of priority from earlier Japanese Patent Application No. 2008-322342 filed Dec. 18, 2008, the description of which is incorporated herein by reference.

BACKGROUND OF THE INVENTION

1. Technical Field of the Invention

The present invention relates to a method and an apparatus for calibrating the position and attitude of the tip of an arm of a robot, such as an articulated type of robot preferably for use on factory floors.

2. Related Art

Industrial robots equipped with an articulated type of arm (called a manipulator) are now used in various kinds of sites. In such a robot, for reasons which are attributable to errors of motions of mechanical components and other factors, controlling the position of the tip of an arm requires calibration to make an actual position of the arm tip accord with a commanded positional value.

For example, one calibration technique is disclosed in Japanese Patent Laid-open Publication No. HEI 7-68480. In this publication, an error $\Delta r$ is calculated between the positions and attitudes (positions/attitudes) of the tip of a manipulated arm, in which the positions and attitudes are calculated in a given coordinate system and measured by a measurement device placed outside the robot. Further, the calculated error $\Delta r$ is applied to the conversion using a Jacobian determinant so that the error $\Delta r$ is converted to calibration amounts (i.e., amounts to be offset) $\Delta \theta$ for the angles of respective joist of the root. Each of the offset amounts is added to each of actually detected angles of the arm to calculate the position and attitude of the tip of the manipulated arm again in the coordinate system. Further the error or is calculated again using the newly calculated position and attitude of the arm tip. The processing for the above steps is repeated until the error $\Delta r$ becomes equal to or less than an allowable amount.

With reference to FIG. 1, this calculation technique will now be described. FIG. 1 shows the configuration of a robot system, which illustrates a model in which a six-axis vertical articulated type of robot 1 is calibrated. This robot system thus functionally includes a calibration apparatus for the robot 1.

The robot 1 is equipped with a manipulated arm whose tip end composes a flange 2. A tool 3 is attached to the flange 2. In FIG. 1, for simplification, only the tip of the tool 3 is illustrated as a representative for the tool 3. In this description, the tip (tip portion) of the tool 3 is thus provided as a "tip of a manipulated arm of the robot 1" (hereinafter, simply referred to as an "arm tip of the robot 1").

A measurement device 4 is also provided, which is for example an optical camera, an infrared sensor, or a laser tracker. This measurement device 4 measures the arm tip of the robot 1 and provides a visual sensor controller 5 with signals of measured results (that is, measured visual information) for control of the position and attitude of the arm tip. The visual-sensor controller 5 uses the measured results to produce information indicating the position and attitude of the arm tip of the robot 1 and provides it to a control computer 6.

The robot 1 is provided with plural joint mechanical portions which provide respective axes and have joint angle detector 7 respectively. A signal indicative of a measured angle of each joint is handed to a robot controller 8 which serves as arm control means. The robot controller 8 operates based on a control program which requires input of the measured angles of the respective joints, so that the robot controller 8 controls the operations of the robot 1. The information indicative of the measured joint angles is also provided to the control computer 6, which is thus able to use the provided information to perform the calculation for the calibration.

The coordinate systems adopted by the model shown in FIG. 1 include a coordinate system $(X_0, Y_0, Z_0)$ whose point of origin is a position where the measurement device 4 is located, a coordinate stem $(X_r, Y_r, Z_r)$ whose point of origin is set to the position of a base which is the base portion of the robot 1, and a coordinate system $(X_f, Y_f, Z_f)$ whose point of origin is the position of the flange 2.

In these coordinate systems, when the tip of the tool 3 is given as a measured point so that the measurement device 4 measures the position and attitude of the tip of the tool 3, a homogeneous transformation matrix indicating a vector from the point of origin of the coordinate system $(X_0, Y_0, Z_0)$ to the tip of the tool 3 is expressed as $T_{mea}$. In addition, a homogeneous transformation matrix corresponding to the above homogeneous transformation matrix $T_{mea}$ which is calculated by the control computer 6, is expressed by $T_{rob}$.

Furthermore, the following homogeneous transformation matrices can be defined in the same manner as the above:

$^{meabase}T_{robbase}$ a matrix indicating a vector from the position measurement device to the robot base;

$^{robbase}T_{flange}$ a matrix indicating a vector from the robot base to the robot flange; and $^{flange}T_{tool}$ a matrix indicating a vector from the robot base to the tip of the tool.

On computation, the following relationship (A) is established among the homogeneous transformation matrices other than the matrix $T_{mea}$.

$$T_{rob} = {}^{meabase}T_{robbase} \cdot {}^{robbase}T_{flange} \cdot {}^{flange}T_{tool} \quad (A)$$

An error $\Delta \phi T$ is thus calculated as a difference between the matrix $T_{mea}$ based on the measurement and the matrix $T_{rob}$ based on the calculation.

In general, at to the foregoing robot 1, the relationship between angles of the respective axes and the position and attitude of the arm tip is expressed by a homogeneous transformation matrix $\phi$ of 4 rows and 4 columns, as shown by a function f based on a formula (1).

$$\varphi = f(\theta, q) = \begin{bmatrix} n_x & o_x & a_x & p_x \\ n_y & o_y & a_y & p_y \\ n_z & o_z & a_z & p_z \\ 0 & 0 & 0 & 1 \end{bmatrix} = \begin{bmatrix} R & P \\ 0 & 1 \end{bmatrix} \quad (1)$$

$$q = [q_1 \cdots q_n]$$

$$\theta = [\theta_1 \cdots \theta_n]$$

$$R = \begin{bmatrix} n_x & o_x & a_x \\ n_y & o_y & a_y \\ n_z & o_z & a_z \end{bmatrix} \quad P = \begin{bmatrix} p_x \\ p_y \\ p_z \end{bmatrix}$$

In the formula (1), the function f is defined by both a variable $\theta$ which expresses angles of the respective axes of the robot 1 and a variable q which expresses a parameter to be calibrated. The variable q expresses various parameters including physical parameters of the robot 1, the positional and attitudinal relationship between the flange 2 and the tool 3, and the positional and attitudinal relationship between the measurement device 4 and the robot 1. Further, the function f is defined by a matrix R and a matrix P. The matrix R is a rotation matrix which shows respective components of a normal vector, an orientation vector, and an approach vector of the arm tip of the robot 1, and the matrix P is a position vector of the arm tip of the robot 1. Both vectors R and P are defined in the coordinate system $(X_r, Y_r, Z_r)$ of the robot 1.

Furthermore, the error $\Delta\phi$ of position and attitude of the arm tip is related to the variable q to be calibrated, by using a Jacobian determinant $J_q(\theta, q)$ and an error vector $\Delta q$ of the variable being calibrated, as shown by a formula (2).

$$\Delta\varphi = J_q(\theta, q) \cdot \Delta q \quad (2)$$

$$J_q(\theta, q) = \begin{bmatrix} n_{y,rob}/\partial q_1 & \cdots & n_{y,rob}/\partial q_m \\ \vdots & \ddots & \vdots \\ p_{z,rob}/\partial q_1 & \cdots & p_{z,rob}/\partial q_m \end{bmatrix}$$

$$\Delta q = [\Delta q_1 \; \Delta q_2 \; \ldots \; \Delta q_{m-1} \; \Delta q_m]^t$$

Using the formula (1), the error $\Delta\phi T$ appearing in the formula (4) can be changed as shown in a formula (3).

$$\Delta\varphi_T = T_{mea} - T_{rob} \quad (3)$$

$$= \begin{bmatrix} n_{x,mea} - n_{x,rob} & o_{x,mea} - o_{x,rob} & a_{x,mea} - a_{x,rob} & p_{x,mea} - p_{x,rob} \\ n_{y,mea} - n_{y,rob} & o_{y,mea} - o_{y,rob} & a_{y,mea} - a_{y,rob} & p_{y,mea} - p_{y,rob} \\ n_{z,mea} - n_{z,rob} & o_{z,mea} - o_{z,rob} & a_{z,mea} - a_{z,rob} & p_{z,mea} - p_{z,rob} \\ 0 & 0 & 0 & 0 \end{bmatrix}$$

Hence, the error $\Delta\phi$, which shows the error vector for the position and attitude of the arm tip of the robot 1, can be expressed as shown in a formula (4).

$$\Delta\phi = [\Delta\phi_T(1,2)\Delta\phi_T(2,2)\Delta\phi_T(3,2)\ldots\Delta\phi_T(3,4)]^t \quad (4)$$

In the formula (3), when two vectors among the normal, orient and approach vectors are given, a vector product of the given two vectors gives a remaining single vector. Hence, the formula (4) is expressed by a matrix of 9 rows and 1 column in which the error of the normal vector is omitted. Incidentally, a vector being omitted will not be limited to the normal vector, but any of the orientation and approach vectors may be omitted.

In addition, the formula (2) can be expressed as a formula (5).

$$\Delta q = (J_q(\theta,q)^t \cdot J_q(\theta,q))^{-1} \cdot J_q(\theta,q)^t \cdot \Delta\phi \quad (5)$$

The formula (5) of $\Delta q$ has a right-hand side, in which the remaining part other than $\Delta\phi$ provides a simulated inverse matrix of the Jacobian determinant $J_q(\theta, q)$.

Expanding the formula (2) at multiple n points (n≧2: positive integer) provides a formula (6), which also allows the formula (5) to be expanded into a formula (7).

$$\begin{bmatrix} \Delta\varphi_1 \\ \vdots \\ \Delta\varphi_n \end{bmatrix} = \begin{bmatrix} J_{q,1}(\theta, q) \\ \vdots \\ J_{q,n}(\theta, q) \end{bmatrix} \cdot \Delta q \quad (6)$$

$$\Delta q = \left( \begin{bmatrix} J_{q,1}(\theta, q) \\ \vdots \\ J_{q,n}(\theta, q) \end{bmatrix}^t \begin{bmatrix} J_{q,1}(\theta, q) \\ \vdots \\ J_{q,n}(\theta, q) \end{bmatrix} \right)^{-1} \begin{bmatrix} J_{q,1}(\theta, q) \\ \vdots \\ J_{q,n}(\theta, q) \end{bmatrix}^t \cdot \begin{bmatrix} \Delta\varphi_1 \\ \vdots \\ \Delta\varphi_n \end{bmatrix} \quad (7)$$

In consequence, the calibration is made such that the error vector $\Delta q$ is calculated by using the formula (7), the parameter q is updated by adding the calculated error vector $\Delta q$ thereto, as shown in a formula (8).

$$q = q + \Delta q \quad (8)$$

This calculation and update is repeated until a sum $\Delta\phi_{all}$ of the errors $\Delta\phi$ at multiple n points, which is shown by a formula (9), becomes equal to or less than a given threshold $\epsilon$.

$$\Delta\varphi_{all} = \sum \begin{bmatrix} |\Delta\varphi_1| \\ \vdots \\ |\Delta\varphi_n| \end{bmatrix} \quad (9)$$

Incidentally, the technique taught by Japanese Patent Laid-open Publication No. HEI 7-68480 is applied to a condition where a parameter being calibrated is dedicated to only offsets of respective axis angles (i.e., errors of the respective axes at the point of origin). This means that the Jacobian determinant becomes holomorphic. Hence, without using the simulated inverse matrix shown in the formula (5), an inverse matrix $J^{-1}$ is used the technique by the above publication.

By the way, in principle, the calibration requires only information about the robot physical parameter q indicating relationships including positional relationships between the tool and the measurement device and between the tool and the robot. However, the calibration technique taught by the foregoing publication requires i) information about the position and attitude indicating a relationship between the measurement device and the robot base and ii) information about the position and attitude indicating the flange (the arm tip) and the tool tip, in addition to information about the robot physical parameter. The foregoing two types of information i) and ii) are unknown because a robot is installed in different factories whose environmental conditions differ from each other, but it is required to calculate the robot physical parameter in the case of the technique taught by the foregoing publication. In consequence, the calculation for obtaining the robot physical parameter should will include the errors given by the foregoing two types of additional information i) and ii), resulting in that accuracy of the calibration will decrease due to the additional inclusion of the errors.

Additionally, the calibration technique taught by the foregoing publication is faced with an inconvenience resulting from estimation of absolute position. Though the forgoing conventional calibration is directed to improvement in absolute positional accuracy, it is usually very difficult to measure the absolute position of the arm tip of a robot. Thus, as a substitute procedure, the accuracy of the calibration is frequently estimated, based on relative position and attitude relationships obtained under a condition where a certain point related to a robot or a factor floor is assigned to a reference point. In effect, in a factor floor where a robot is installed, a certain reference point is first taught to the robot and other teaching points are taught based on a relative positional and attitudinal relationship with the reference point. The conventional calibration ignores the relative positional and attitudinal estimation, and is inconvenient in use in actual factory floors, often providing insufficient accuracy to the calibration.

SUMMARY OF THE INVENTION

The present invention has been made in consideration with the forgoing difficulties, and an object of the present invention is to calibrate the position and attitude of the arm tip of an articulated type of robot at higher accuracy by removing as many error factors as possible from a step of calculating the robot physical parameter In order to achieve the above object, the present invention provides, as one aspect, a method of positionally calibrating the tip (tip portion) of an arm of a manipulated type of robot, the arm tip being an end portion of a tool held by the arm, comprising steps of: controlling the arm so that the arm tip is moved to a plurality of positions (n: positive integer more than 1); calculating, at the plurality of positions, n pieces of errors ($\Delta\phi$: $\Delta\phi_1$, $\Delta\phi_2$, ..., $\Delta\phi_n$, wherein n is a natural number larger than a value obtained by dividing the number of unknown parameters by 3), respectively, each of the errors being an error between a position of the arm tip measured by a measurement device and a position commanded by control at each of the plurality of positions; calculating an inter-error difference ($\Delta\epsilon_y$ ($1 \leq y \leq n-1$)) between a given reference error ($\Delta\phi_m$ ($1 \leq m \leq n$)) arbitrarily selected from the n-piece errors ($\Delta\phi$) and other errors ($\Delta\phi_x$ ($x \leq n$, except for m)) left other than the given reference error ($\Delta\phi_m$) among the n-piece errors; and making a parameter, which is a basis for calculating the inter-error differences ($\Delta\epsilon_y$), converge until a sum of absolute values of the respective inter-error differences ($\Delta\epsilon_y$) becomes equal to or less than a given threshold ($\epsilon_0$ ($\epsilon_0 > 0$)), wherein the converging step further includes steps of: calculating a Jacobian determinant (J) for parameter matrices (q, $\theta$), wherein (q) is a matrix of the parameters and 0 is a matrix of angles of respective axes of the arm, calculating an error matrix ($\Delta q$) of the parameter matrix q based on a product of an inter-error difference ($\Delta\epsilon_y$) and a simulated inverse matrix of the Jacobian determinant (J), updating the parameter matrix (q) by adding the error matrix ($\Delta q$) to the parameter matrix (q), and re-calculating the position of the arm tip depending on the updated parameter matrix (q), so that the parameter matrix (q) is made to converge so as to calibrate the position of the arm tip.

As stated, the idea of calculating a "relative position/attitude error" is introduced, which is a difference between a reference error $\Delta\phi_m$ and the other errors $\Delta\phi_x$. This "relative position/attitude (position and attitude) error" enables calculation of the inter-error difference $\Delta\epsilon_y$. For this reason, part of calculation items required by a matrix indicating the inter-error difference $\Delta\epsilon_y$ can be removed from the calculation for the calibration. As a result, it is possible to exclude estimation errors resulting from calculating the removed items, from entering the estimation of the positions and attitudes (often noted as positions/attitudes) of the arm tip, further improving accuracy of the calibration.

As another aspect of the present invention, three is also provided an apparatus for calibrating of a position of a tip (tip portion) of an arm of a manipulated type of robot, the arm tip being a tip portion of a tool held by the arm, comprising: arm control means for controlling the arm so that the arm tip is moved to a plurality of positions (n); error calculating means for calculating, at the plurality of positions, n-piece errors ($\Delta\phi$: $\Delta\phi_1$, $\Delta\phi_2$, ..., $\Delta\phi_n$, wherein n is a natural number larger than a value obtained by dividing the number of unknown parameters by 3), respectively, each of the errors being an error between a position of the arm tip measured by a measurement device and a position commanded by control at each of the plurality of positions; inter-error difference calculating means for calculating an inter-error difference ($\Delta\epsilon_y$ ($1 \leq y \leq n-1$)) between a given reference error ($\Delta\phi_m$ ($1 \leq m \leq n$)) arbitrarily selected from the n-piece errors ($\Delta\phi$) and other errors ($\Delta\phi_x$ ($x \leq n$, except for m)) left other than the given reference error ($\Delta\phi_m$) among the n-piece errors; and converging means for making a parameter, which is a basis for calibrating the inter-error differences ($\Delta\epsilon_y$), converge until a sum of absolute values of the respective inter-error differences ($\Delta\epsilon_y$) becomes equal to or less than a given threshold ($\epsilon_0$ ($\epsilon_0 > 0$)), wherein the converging means comprises Jacobian determinant calculating means for calculating a Jacobian determinant (J) for parameter matrices (q, $\theta$), wherein (q) is a matrix of the parameters and 0 is a matrix of angles of respective axes of the arm, error matrix calculating means for calculating an error matrix ($\Delta q$) of the parameter matrix q based on a product of an inter-error difference ($\Delta\epsilon_y$) and a simulated inverse matrix of the Jacobian determinant (J), updating means for updating the parameter matrix (q) by adding the error matrix ($\Delta q$) to the parameter matrix (q), and re-calculating means for re-calculating the position of the arm tip depending on the updated parameter matrix (q), so that the parameter matrix (q) is made to converge so as to calibrate the position of the arm tip.

DETAILED DESCRIPTION OF THE PREFERRED EMBODIMENTS

With reference to the accompanying drawings, preferred embodiments of the present invention will now be described.

First Embodiment

Figure 2:
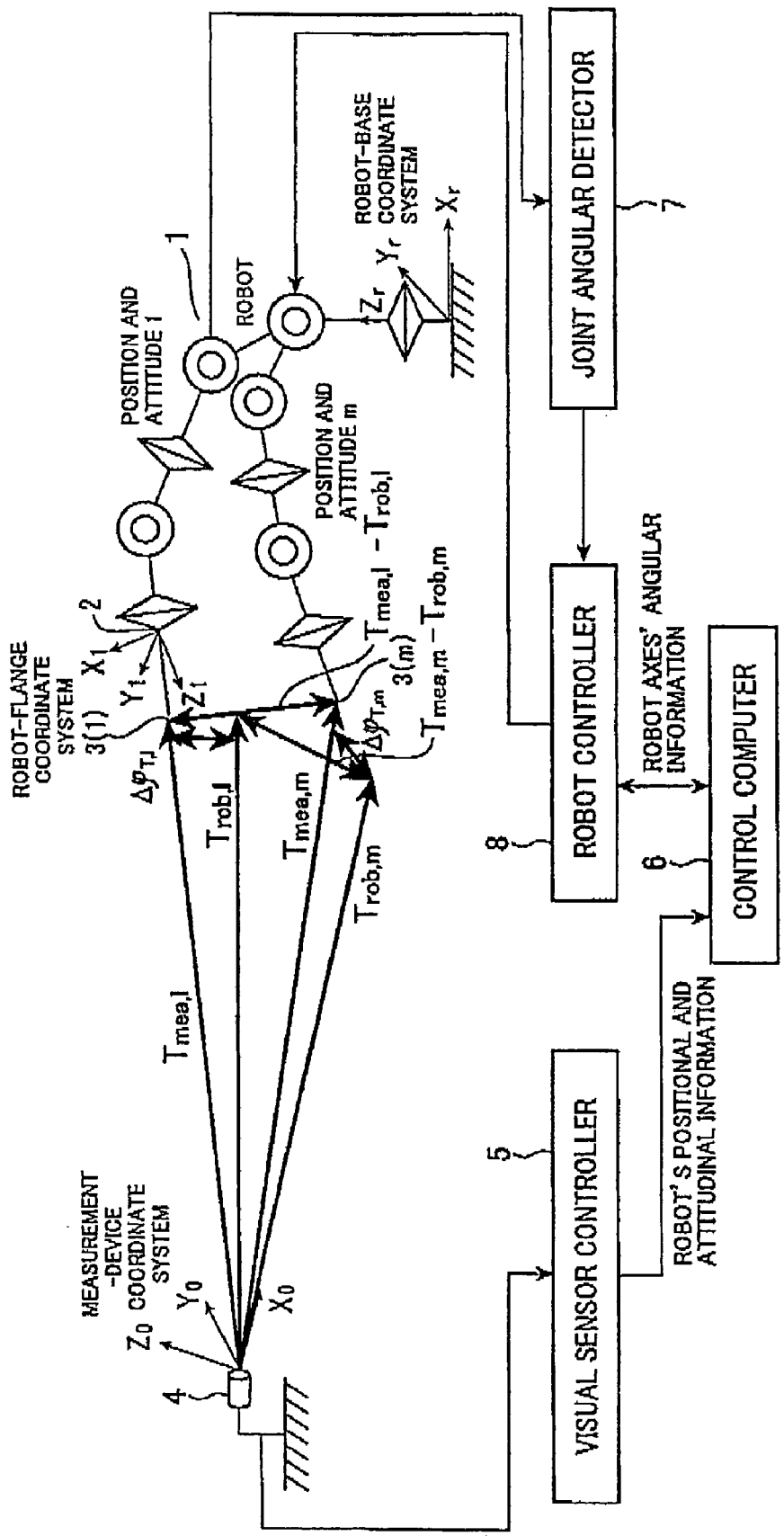
FIG. 2 is a block diagram showing a hardware system configuration illustrating a model of an articulated type of robot and a calibration apparatus according to a first to third embodiments of the present invention.
Figure 3:
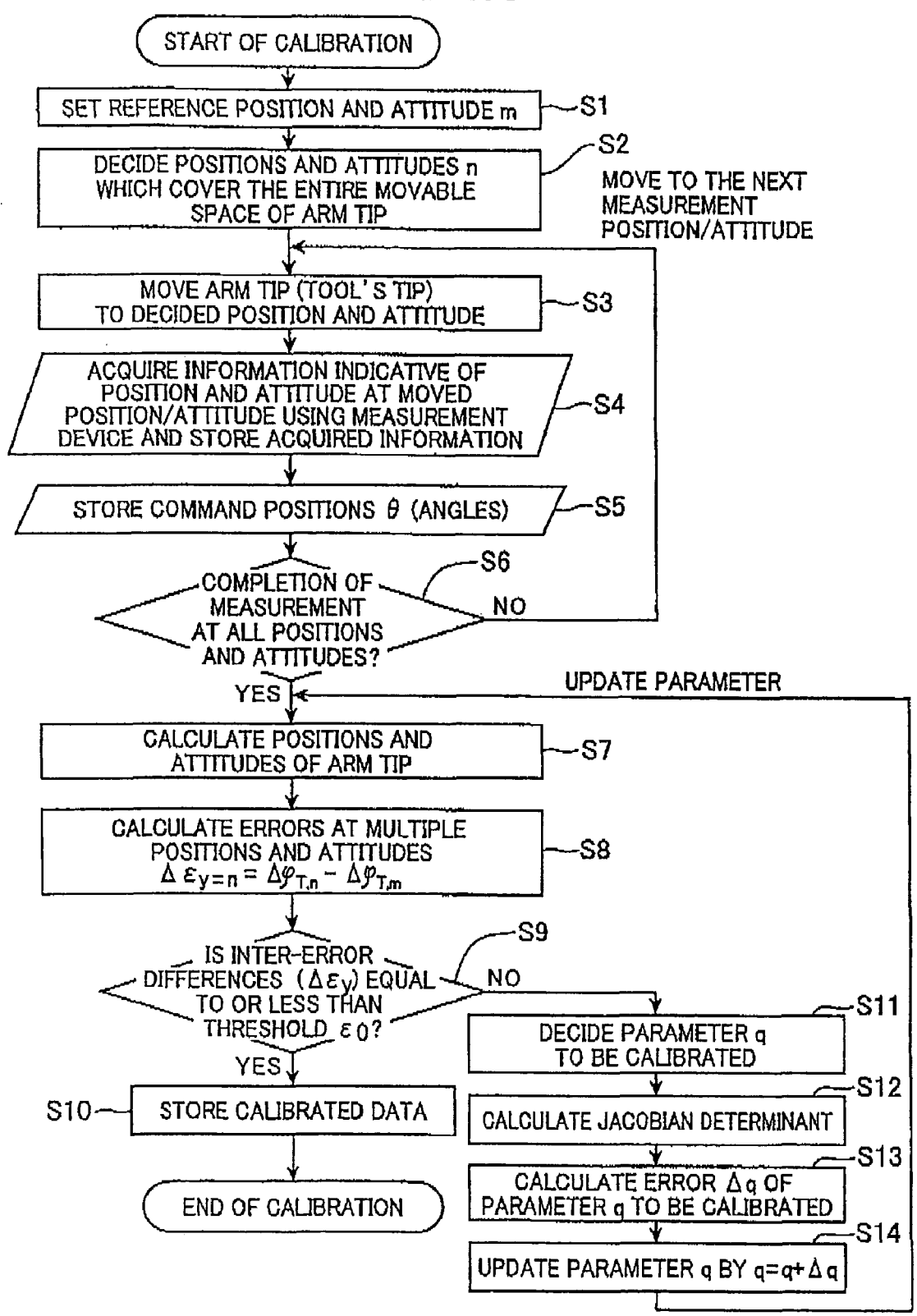
FIG. 3 is a flowchart showing the process for calibration performed by a control computer, which process is according to a first embodiment of the present invention.

Referring to FIGS. 2 and 3, a first embodiment of the calibration apparatus according to the present invention will now be described.

Figure 1:
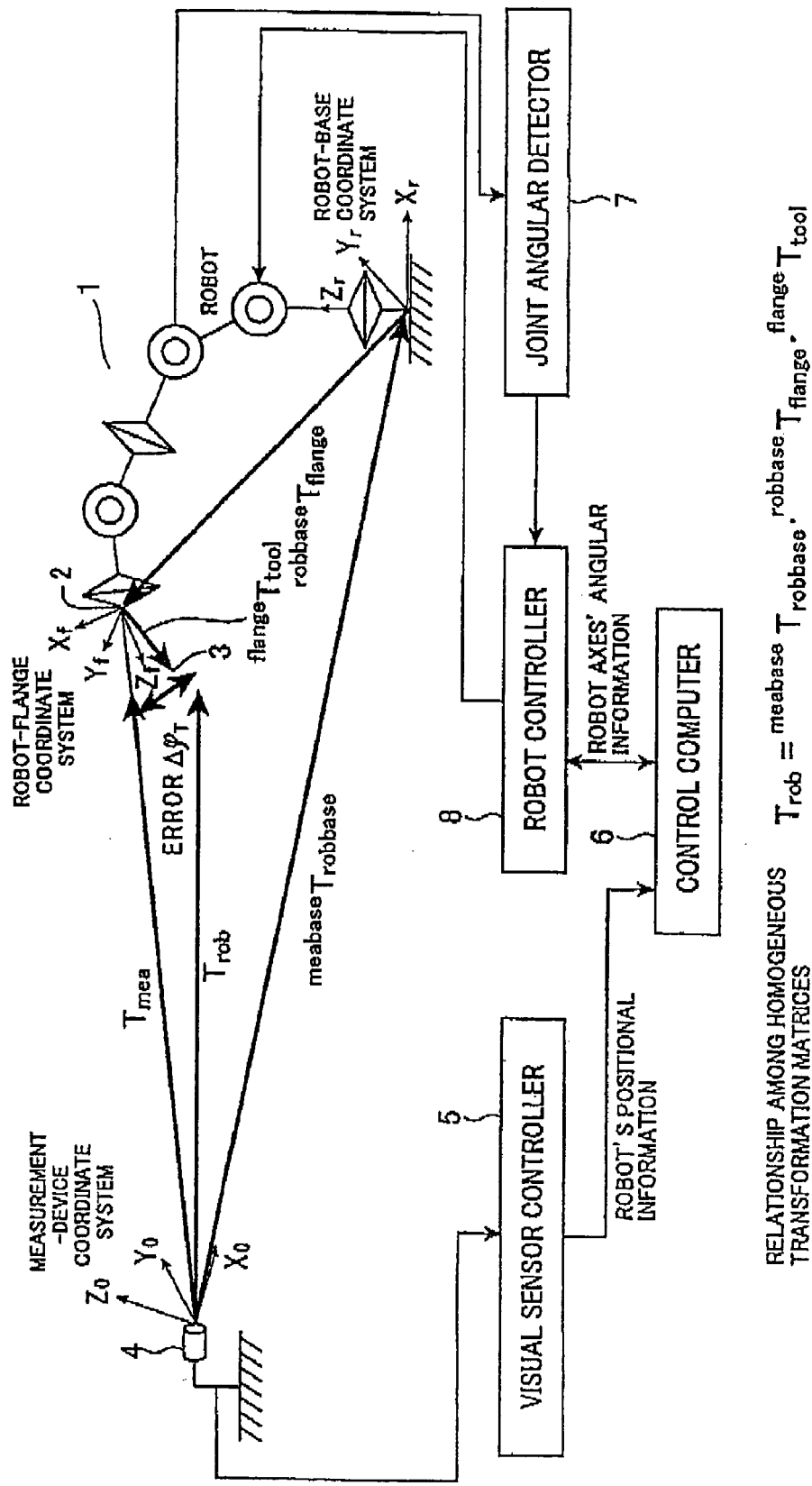
FIG. 1 is a block diagram showing a hardware system configuration illustrating a model of an articulated type of robot and a conventional calibration apparatus.

The configuration of a robot system shown in FIG. 2 is the same as that shown in FIG. 1 except for a technique for calibration which is performed by the control computer 6. Hence, the same components in FIG. 2 are given the same reference numerals as those shown in FIG. 1 for a simplified description.

Practically, in the configuration in FIG. 1, the arm tip of the robot 1, which is the tip of the tool 3, is calibrated for its one position and attitude by calculating an error between a measured result of the measurement device 4 and a control result of the control computer 6. By contrast, in the present embodiment, the arm tip of the robot 1 is calibrated in tow control modes in which the arm tip is controlled at a position and attitude (position/attitude) "1" and a position and attitude (position/attitude) "m". In each control mode, the calibration is made by calculating an error between a measured result of the measurement device 4 and a control result of the control computer 6. Of the two positions and attitudes "1 (position 1, attitude 1)" and "m (position m, attitude m)", the position and attitude "m" is employed as a reference for the calibration.

A homogeneous transformation matrix indicating a vector from the point of origin to the position and attitude "1" at the tip of the tool 3 in the coordinate system $(X_0, Y_0, Z_0)$ of the measurement device 4 is provided as $T_{mea,1}$. A homogeneous transformation matrix being calculated by the control computer 6 and corresponding to the homogeneous transformation matrix $T_{mea,1}$ is provided as $T_{rob,1}$. In the same manner as the above, homogeneous transformation matrices to the position and attitude (m) are provided as $T_{mea,m}$ and $T_{rob,m}$.

A difference between a relative position and attitude at the positions and attitudes (positions/attitudes) (1) and (m), which corresponds to a difference between i) a difference between measured relative positions and attitudes ($T_{mea,1} - T_{mea,m}$) and ii) a difference between calculated relative positions and attitudes ($T_{rob,1} - T_{rob,m}$), is provided by a formula (10).

$$(T_{mea,1} - T_{mea,m}) - (T_{rob,1} - T_{rob,m}) = (T_{mea,1} - T_{rob,1}) - (T_{mea,m} - T_{rob,m}) \quad (10)$$
$$= \Delta\varphi 1 - \Delta\varphi m$$

This formula (10) can be converted with the formula (6), producing a formula (11) as follows.

$$\begin{bmatrix} \Delta\varphi_1 - \Delta\varphi_m \\ \vdots \\ \Delta\varphi_n - \Delta\varphi_m \end{bmatrix} = \begin{bmatrix} J_{q,1}(\theta, q) - J_{q,m}(\theta, q) \\ \vdots \\ J_{q,n}(\theta, q) - J_{q,m}(\theta, q) \end{bmatrix} \cdot \Delta q \quad (11)$$

Hence, the corresponding error vector $\Delta q$ can be expressed by a formula (12), which is as follows:

$$\Delta q = \left( \begin{bmatrix} J_{q,1}(\theta, q) - J_{q,m}(\theta, q) \\ \vdots \\ J_{q,n}(\theta, q) - J_{q,m}(\theta, q) \end{bmatrix}^t \begin{bmatrix} J_{q,1}(\theta, q) - J_{q,m}(\theta, q) \\ \vdots \\ J_{q,n}(\theta, q) - J_{q,m}(\theta, q) \end{bmatrix} \right)^{-1} \quad (12)$$
$$\begin{bmatrix} J_{q,1}(\theta, q) - J_{q,m}(\theta, q) \\ \vdots \\ J_{q,n}(\theta, q) - J_{q,m}(\theta, q) \end{bmatrix}^t \begin{bmatrix} \Delta\varphi_1 - \Delta\varphi_m \\ \vdots \\ \Delta\varphi_n - \Delta\varphi_m \end{bmatrix}$$

When the position and attitude (1) can be generalized to be expanded to a position and attitude (n), a maximum number of poison and attitudes is n pieces from 1 to n and an error $\Delta\phi_{T,n}$ for the position and attitude (n) is provided by a formula (13), which is as follows:

$$\Delta\phi_{T,n} = T_{mea,n} - T_{rob} \quad (13)$$

wherein the parameter n (=1–n) indicates a variable which is a representative for n-piece positions and attitudes (1) to (n). The reference "n" is noted as a reference "x" in the claims of the present invention.

In addition, for calibrating the position and attitude of the arm tip of the robot 1, the number of parameters obtained from the measurement device 4 is 6. Hence, the reference n is set to a value which is larger than a value obtained by dividing, by 6, the number of other unknown parameters.

From the formula (A), the following formula is provided:

$$\Delta\phi_{T,n} = T_{mea,n} - {}^{meabase}T_{robbase} \cdot {}^{robbase}T_{flange,n} \cdot {}^{flange}T_{tool} \quad (14)$$

wherein the homogeneous transformation matrices $T_{mea,n}$ and ${}^{robbase}T_{flange,n}$ are defined by formulas (15) and (16), which are as follows:

$$T_{mea,n} = \begin{bmatrix} n_{x,mea,n} & o_{x,mea,n} & a_{x,mea,n} & p_{x,mea,n} \\ n_{y,mea,n} & o_{y,mea,n} & a_{y,mea,n} & p_{y,mea,n} \\ n_{z,mea,n} & o_{z,mea,n} & a_{z,mea,n} & p_{z,mea,n} \\ 0 & 0 & 0 & 1 \end{bmatrix} \quad (15)$$

$${}^{robbase}T_{flange,n} = \begin{bmatrix} n_{x,robflan,n} & o_{x,robflan,n} & a_{x,robflan,n} & p_{x,robflan,n} \\ n_{y,robflan,n} & o_{y,robflan,n} & a_{y,robflan,n} & p_{y,robflan,n} \\ n_{z,robflan,n} & o_{z,robflan,n} & a_{z,robflan,n} & p_{z,robflan,n} \\ 0 & 0 & 0 & 1 \end{bmatrix} \quad (16)$$

Using these formulas, a difference (called an inter-error difference) $\Delta\epsilon_y$ (y=n) between the error $\Delta\phi_{T,n}$ concerning with the position and attitude n and the error $\Delta\phi_{T,m}$ concerning with the position and attitude m can be obtained by a formula (17), which is as follows:

$$\Delta\varphi_{T,n} - \Delta\varphi_{T,m} = T_{mea,n} - {}^{meabase}T_{robbase} \cdot {}^{robbase}T_{flange,n} \cdot \quad (17)$$
$${}^{flange}T_{tool} -$$
$$(T_{mea,n} - {}^{meabase}T_{robbase} \cdot {}^{robbase}T_{flange,m} - {}^{flange}T_{tool})$$
$$= (T_{mea,n} - T_{mea,m}) -$$
$$({}^{meabase}T_{robbase} \cdot {}^{robbase}T_{flange,n} \cdot {}^{flange}T_{tool} +$$
$$({}^{meabase}T_{robbase} \cdot {}^{robbase}T_{flange,m} \cdot {}^{flange}T_{tool})$$
$$= (T_{mea,n} - T_{mea,m}) - {}^{meabase}T_{robbase} \cdot$$
$$({}^{robbase}T_{flange,n} - {}^{robbase}T_{flange,m}) \cdot$$
$${}^{flange}T_{tool}$$

This formula (17) can be developed into formulae (18) and (19), which are as follows:

$$\Delta\varphi_{T,n} - \Delta\varphi_{T,m} = (T_{mea,n} - T_{mea,m}) - {}^{meabase}T_{robbase} \cdot$$
$$\begin{bmatrix} n_{x,rob,n} - n_{x,rob,m} & o_{x,rob,n} - o_{x,rob,m} & a_{x,rob,n} - a_{x,rob,m} & p_{x,rob,n} - p_{x,rob,m} \\ n_{y,rob,n} - n_{y,rob,m} & o_{y,rob,n} - o_{y,rob,m} & a_{y,rob,n} - a_{y,rob,m} & n_{y,rob,n} - p_{y,rob,m} \\ n_{z,rob,n} - n_{z,rob,m} & o_{z,rob,n} - o_{z,rob,m} & a_{z,rob,n} - a_{z,rob,m} & p_{z,rob,n} - p_{z,rob,m} \\ 0 & 0 & 0 & 1 \end{bmatrix} \cdot {}^{flange}T_{tool}$$

$$= (T_{mea,n} - T_{mea,m}) - \begin{bmatrix} {}^{meabase}R_{robbase} & {}^{meabase}P_{robbase} \\ 0 & 1 \end{bmatrix}$$

$$\begin{bmatrix} {}^{meabase}R_{robbase,n} - {}^{meabase}R_{robbase,m} & {}^{meabase}P_{robbase,n} - {}^{meabase}P_{robbase,m} \\ 0 & 0 \end{bmatrix} \cdot {}^{flange}T_{tool}$$

$$= (T_{mea,n} - T_{mea,m}) -$$

$$\begin{bmatrix} {}^{meabase}R_{robbase} \cdot ({}^{meabase}R_{robbase,n} - {}^{meabase}R_{robbase,m}) & {}^{meabase}R_{robbase} \cdot ({}^{meabase}P_{robbase,n} - {}^{meabase}P_{robbase,m}) \\ 0 & 0 \end{bmatrix} \cdot {}^{flange}T_{tool}$$

$$\Delta\varphi_{T,n} - \Delta\varphi_{T,m} = (T_{mea,n} - T_{mea,m}) - {}^{meabase}T_{robbase} \cdot \begin{bmatrix} n_{x,rob,n} - n_{x,rob,m} & o_{x,rob,n} - o_{x,rob,m} & a_{x,rob,n} - a_{x,rob,m} & p_{x,rob,n} - p_{x,rob,m} \\ n_{y,rob,n} - n_{y,rob,m} & o_{y,rob,n} - o_{y,rob,m} & a_{y,rob,n} - a_{y,rob,m} & p_{y,rob,n} - p_{y,rob,m} \\ n_{z,rob,n} - n_{z,rob,m} & o_{z,rob,n} - o_{z,rob,m} & a_{z,rob,n} - a_{z,rob,m} & p_{z,rob,n} - p_{z,rob,m} \\ 0 & 0 & 0 & 0 \end{bmatrix} \cdot {}^{flange}T_{tool} = \quad (18)$$

$$(T_{mea,n} - T_{mea,m}) - \begin{bmatrix} {}^{meabase}R_{robbase} & {}^{meabase}P_{robbase} \\ 0 & 1 \end{bmatrix} \begin{bmatrix} n_{x,rob,n} - n_{x,rob,m} & o_{x,rob,n} - o_{x,rob,m} & a_{x,rob,n} - a_{x,rob,m} & p_{x,rob,n} - p_{x,rob,m} \\ n_{y,rob,n} - n_{y,rob,m} & o_{y,rob,n} - o_{y,rob,m} & a_{y,rob,n} - a_{y,rob,m} & p_{y,rob,n} - p_{y,rob,m} \\ n_{z,rob,n} - n_{z,rob,m} & o_{z,rob,n} - o_{z,rob,m} & a_{z,rob,n} - a_{z,rob,m} & p_{z,rob,n} - p_{z,rob,m} \\ 0 & 0 & 0 & 0 \end{bmatrix} \cdot {}^{flange}T_{tool} =$$

$$(T_{mea,n} - T_{mea,m}) - \begin{bmatrix} {}^{meabase}R_{robbase} & {}^{meabase}P_{robbase} \\ 0 & 1 \end{bmatrix} \begin{bmatrix} {}^{meabase}R_{robbase,n} - {}^{meabase}R_{robbase,m} & {}^{meabase}P_{robbase,n} - {}^{meabase}P_{robbase,m} \\ 0 & 0 \end{bmatrix} \cdot {}^{flange}T_{tool}$$

$$= (T_{mea,n} - T_{mea,m}) - \begin{bmatrix} {}^{meabase}R_{robbase} \cdot ({}^{meabase}R_{robbase,n} - {}^{meabase}R_{robbase,m}) & {}^{meabase}R_{robbase} \cdot ({}^{meabase}P_{robbase,n} - {}^{meabase}P_{robbase,m}) \\ 0 & 0 \end{bmatrix} \cdot {}^{flange}T_{tool} \quad (19)$$

The terms ${}^{meabase}R_{robbase}$, ${}^{meabase}R_{robbase,n}$, ${}^{meabase}R_{robbase,m}$, ${}^{meabase}P_{robbase}$, ${}^{meabase}P_{robbase,m}$, ${}^{flange}T_{tool}$ in the above formula (19) are expressed as terms ${}^{mb}R_{rb}$, ${}^{mb}R_{rb,x}$, ${}^{mb}R_{rb,m}$, ${}^{mb}P_{rb,x}$, ${}^{mb}P_{rb,m}$, ${}^{fl}T_{tool}$ in the claims of the present invention.

The term of ${}^{meabase}P_{robbase}$ in the formula (18) disappears in the formula (19) and this is characteristic of the present embodiment. As explained before, ${}^{meabase}P_{robbase}$ is a positional vector from the measurement device 4 to the robot base and consists of three variables. Objective values to be calibrated are the physical parameters of the robot 1. In this respect, in order to obtain the physical parameters of the robot 1, the conventional technique described before requires calculation of a position and an attitude, ${}^{meabase}P_{robbase}$ and ${}^{meabase}R_{robbase}$, indicating the relationship between the measurement device 4 and the robot base, and a position and an attitude, ${}^{flange}T_{tool}$, indicating the relationship between the flange of the robot and the arm tip thereof.

In contrast, according to the present embodiment which is based on the formula (19), it is not required to calculate the three variables in the positional vector ${}^{meabase}P_{robbase}$, which will improve accuracy of calculation of the inter-error difference $\Delta\epsilon_y$ (y=n) depending on the non-necessity of the calculation. Since when the inter-error difference $\Delta\epsilon_y$ can be obtained, the error vector $\Delta q$ can be calculated by the formula (12). Hence, after obtaining this error vector $\Delta q$, the calculation for the calibration can use the calculated amount $\Delta q$ to continue in the same manner as the conventional technique described before. Accordingly, due to omitting the three variables in the positional vector ${}^{meabase}P_{robbase}$, the calibration can be performed with higher accuracy.

Referring to FIG. 3, a flowchart showing how to perform the calibration processing, including steps for calculating the inter-error difference $\Delta\epsilon_y$ on the manner as above, will now be described. This processing is carried out by the control computer 6.

First, the control computer 6 decides or selects a reference position and attitude (m) within a movable space of the arm of the robot 1 (step S1). The control computer 6 then decide a plurality of positions and attitudes for calibration (1, 2, ..., n) to cover the entire movable area (step S2). The control computer 6 commands the robot controller 8 to drive the arm so that the tip of the tool 3 is moved to a single positions/attitude selected from the decided position/attitude (step S3). The tip of the tool 3 serves as the arm tip of the robot 1, as stated before. Further, the control computer 6 acquires, through the visual sensor controller 5, information showing results of the position and attitude measured by the measurement device 4 and stores them therein (step S4). The control computer 6 further acquires, through the robot controller 8, angles θ of the respective joints of the robot 1, which are detected by the joint angle detectors 7 (step S5).

The foregoing steps S3 to S6 will be repeated until completion of the above measurement at all the positions and attitudes n (step S6). The processing at step S6 is thus whether or not the measurements at all the positions and attitudes are completed. When all the measurements are completed (YES at step S6), the control computer 6 proceeds to step 7, wherein positions and attitudes at all the positions and attitudes are calculated. The control computer 6 then proceeds to step S7A, wherein an error $\Delta\phi_y$ for each of the positions and attitudes is calculated. Hence, the processing at step S7A functions as error calculating means. Then, the processing shifts to step S8, wherein the control computer 6 uses the foregoing formula (19) to calculate an inter-error difference $\Delta\epsilon_y$ (y=1 to n except for m) with respect o all the positions and attitudes. Hence, the processing at step S8 functions as inter-error difference calculating means.

The control computer then proceeds to step S9 to calculate a sum $\Delta\epsilon_{all}$ of all the inter-error differences $\Delta\epsilon_y$ based on a formula (20), and determine whether or not the absolute value of the calculated sum $\Delta\epsilon_{all}$ is equal to or less than a predetermined threshold ε0.

$$\Delta \varepsilon_{all} = \sum \begin{bmatrix} |\Delta \varphi_1 - \Delta \varphi_m| \\ \vdots \\ |\Delta \varphi_n - \Delta \varphi_m| \end{bmatrix} \quad (20)$$

If the determination at step S9 shows $\Delta \epsilon_{all} > \epsilon 0$ (NO at step S9), the control computer 6 performs the processing at steps S11 to S14 in turn. That is, a parameter q to be calibrated is decided (step S11). A Jacobian determinant J is calculated which depends on the decided parameter q and the respective joint angles θ (step S12). This processing at step S12 functionally composes Jacobian determinant calculating means. Then, an error matrix Δq is calculated based on the formula (12) (step S13), which functionally composes error matrix calculating means. A parameter matrix q is then updated by performing calculation of q=q+Δq (step S14), which thus functionally composes parameter matrix updating means. The processing is returned to step S7 until the affirmative determination comes out at step S9. The processing at steps S9 to S14 functionally composes calibration means.

When the sum (absolute value) $\Delta \epsilon_{all}$ becomes equal to or less than the threshold ε0 (YES at step S9), the currently obtained calibration data, that is, the physical parameters q of the robot 1 are stored in the computer 6 (step S10), and the calibration processing is ended.

In this way, the arm tip of the robot 1 is moved to a plurality of n positions, with which, for each of the n positions, the error Δφ between the position and attitude of the arm tip measured by the measurement device 4 and the position and attitude hereof commanded by the computer 6 is obtained as $\Delta \phi_1, \Delta \phi_2, \ldots, \Delta \phi_n$. Then one of the errors, $\Delta \phi_m$, which is selected arbitrarily, is used as a reference and the error $\Delta \epsilon_y$ of each of the remaining errors $\Delta \phi_x$ from the reference error $\Delta \phi_m$ is calculated based on the formula (19). Until the sum of absolutes of the respective errors $\Delta \epsilon_y$ becomes equal to or less than the predetermined threshold ε0, the parameter q, which gives a basis to the calibration, is calculated repeatedly to make the sum converge.

Practically, a Jacobian determinant J is calculated based on the parameter matrix q and the matrix θ of the axis angles of the robot 1, a product between the inter-error difference and the simulated inverse matrix of the Jacobian determinant J is calculated so that the error matrix Δq for the parameter matrix q is obtained. The error matrix Δq is added to the parameter matrix q so as to update the parameter matrix q. Using the updated parameter matrix q, the position of the arm tip of the robot arm is recalculated to make the parameter matrix q converge to a given threshold range.

In this way, the idea of using the "relative position and attitude error" is introduced into calibrating position of the arm tip of the robot. Hence, compared to using the formula (4) based on the conventional technique, there is no need for using the positional vector $^{meabase}P_{robbase}$ directing from the measurement device 4 to the robot base in the calibration. Namely it is possible to reduce the calculation amount by an amount necessary for the three variables, whereby the accuracy of calculation of the inter-error difference $\Delta \epsilon_y$ can be improved compared to the conventional. Accordingly, this makes it possible to improve the accuracy of the relatively-estimated positional relationships.

In addition, in the present embodiment, the number of positions and attitudes being measured is set to a value larger than a value obtained by dividing, by 6, the number of unknown parameters to be estimated. This gives higher certainty to the calibration of the unknown parameters.

Second Embodiment

Figure 4:
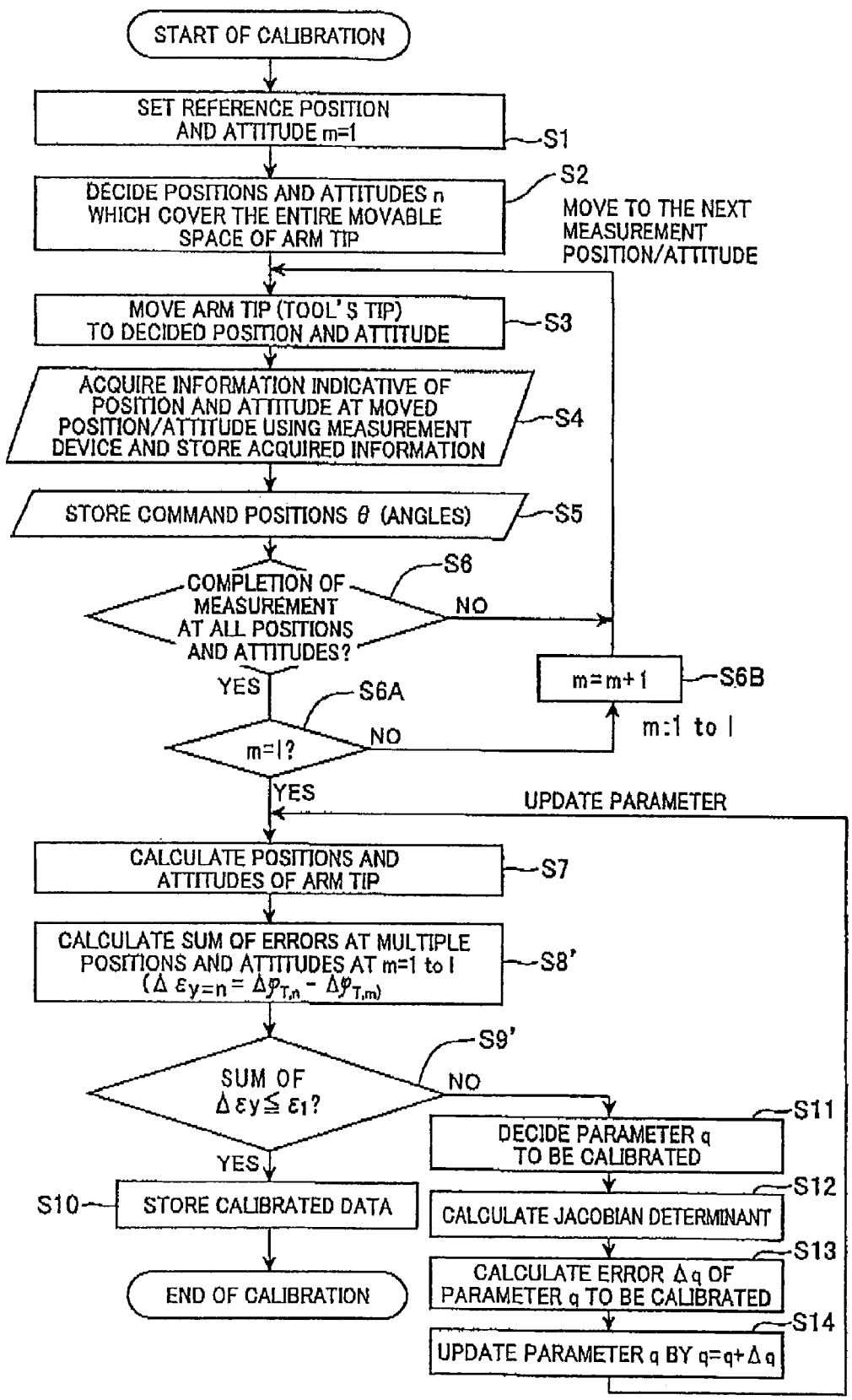
FIG. 4 is a flowchart showing the process for calibration performed by a control computer, which process is according to a first embodiment of the present invention.

Referring to FIG. 4, a second embodiment of the calibration apparatus according to the present invention will now be described.

The second embodiment and subsequent embodiment adopt the same hardware configuration of the robot system as that described in FIG. 2. Hence, the components which are the same as those in the first embodiment are given the same reference numerals for a simplified description.

While the reference position and attitude m in the first embodiment is given only one point, the reference position and attitude m is given a plurality of points (=1 to I) for the calibration in the second embodiment. In this case, as for the error matrix Δq, the formula (12) is replaced by a formula (21), which is as follows:

$$\Delta q = \left( \begin{bmatrix} J_{q,1}(\theta, q) - J_{q,m1}(\theta, q) \\ \vdots \\ J_{q,n}(\theta, q) - J_{q,m1}(\theta, q) \\ J_{q,1}(\theta, q) - J_{q,m2}(\theta, q) \\ \vdots \\ J_{q,n}(\theta, q) - J_{q,m2}(\theta, q) \\ J_{q,1}(\theta, q) - J_{q,m2}(\theta, q) \\ \vdots \\ J_{q,n}(\theta, q) - J_{q,m1}(\theta, q) \end{bmatrix}^t \begin{bmatrix} J_{q,1}(\theta, q) - J_{q,m1}(\theta, q) \\ \vdots \\ J_{q,n}(\theta, q) - J_{q,m1}(\theta, q) \\ J_{q,1}(\theta, q) - J_{q,m2}(\theta, q) \\ \vdots \\ J_{q,n}(\theta, q) - J_{q,m2}(\theta, q) \\ J_{q,1}(\theta, q) - J_{q,m2}(\theta, q) \\ \vdots \\ J_{q,n}(\theta, q) - J_{q,m1}(\theta, q) \end{bmatrix} \right)^{-1} \quad (21)$$

$$\begin{bmatrix} J_{q,1}(\theta, q) - J_{q,m1}(\theta, q) \\ \vdots \\ J_{q,n}(\theta, q) - J_{q,m1}(\theta, q) \\ J_{q,1}(\theta, q) - J_{q,m2}(\theta, q) \\ \vdots \\ J_{q,n}(\theta, q) - J_{q,m2}(\theta, q) \\ J_{q,1}(\theta, q) - J_{q,m2}(\theta, q) \\ \vdots \\ J_{q,n}(\theta, q) - J_{q,m1}(\theta, q) \end{bmatrix}^t \begin{bmatrix} \Delta \varphi_1 - \Delta \varphi_{m1} \\ \vdots \\ \Delta \varphi_n - \Delta \varphi_{m1} \\ \Delta \varphi_1 - \Delta \varphi_{m2} \\ \vdots \\ \Delta \varphi_n - \Delta \varphi_{m2} \\ \Delta \varphi_1 - \Delta \varphi_{m1} \\ \vdots \\ \Delta \varphi_n - \Delta \varphi_{m1} \end{bmatrix}$$

In the process shown in FIG. 4, first of all, one point is selected as the reference position and attitude m at step S1. Further, when it is determined at step S6 that the measurement has been completed, the reference position and attitude m is updated and it is determined whether or not the updated reference position and attitude m reaches the value I, before returning to step S3 (refer to steps S6A and S6B). If it is determined that m=I, the determination at step S6 becomes YES, that is, the measurement at all the position and attitude has been completed.

As to the inter-error difference $\Delta\epsilon_y$, the same steps as the above is applied by sequentially changing the reference position and attitude m to 1 to I, which results in accumulation of I-times of the inter-error difference $\Delta\epsilon_y$ at step S8' as described in the first embodiment. In this case, a sum of the inter-error differences $\Delta\epsilon_y$ is thus calculated to determine whether or not the absolute value of the sum is equal to or less than a preset threshold $\epsilon 1$ (step S9'). This determination is for examining the convergence of the error. The threshold $\epsilon 1$ may be equal to or different from the threshold $\epsilon 0$ used in the first embodiment. The other steps in FIG. 4 are identical in their processing contents to those described in FIG. 3.

In the present embodiment, the plurality of reference positions and attitudes m are set, which are respectively used to estimate the inter-error difference $\Delta\epsilon_y$. Hence, the movable space of the robot arm is calibrated more finely in a wider spatial area, so that the robot arm can be controlled with more accuracy.

Third Embodiment

Figure 5:
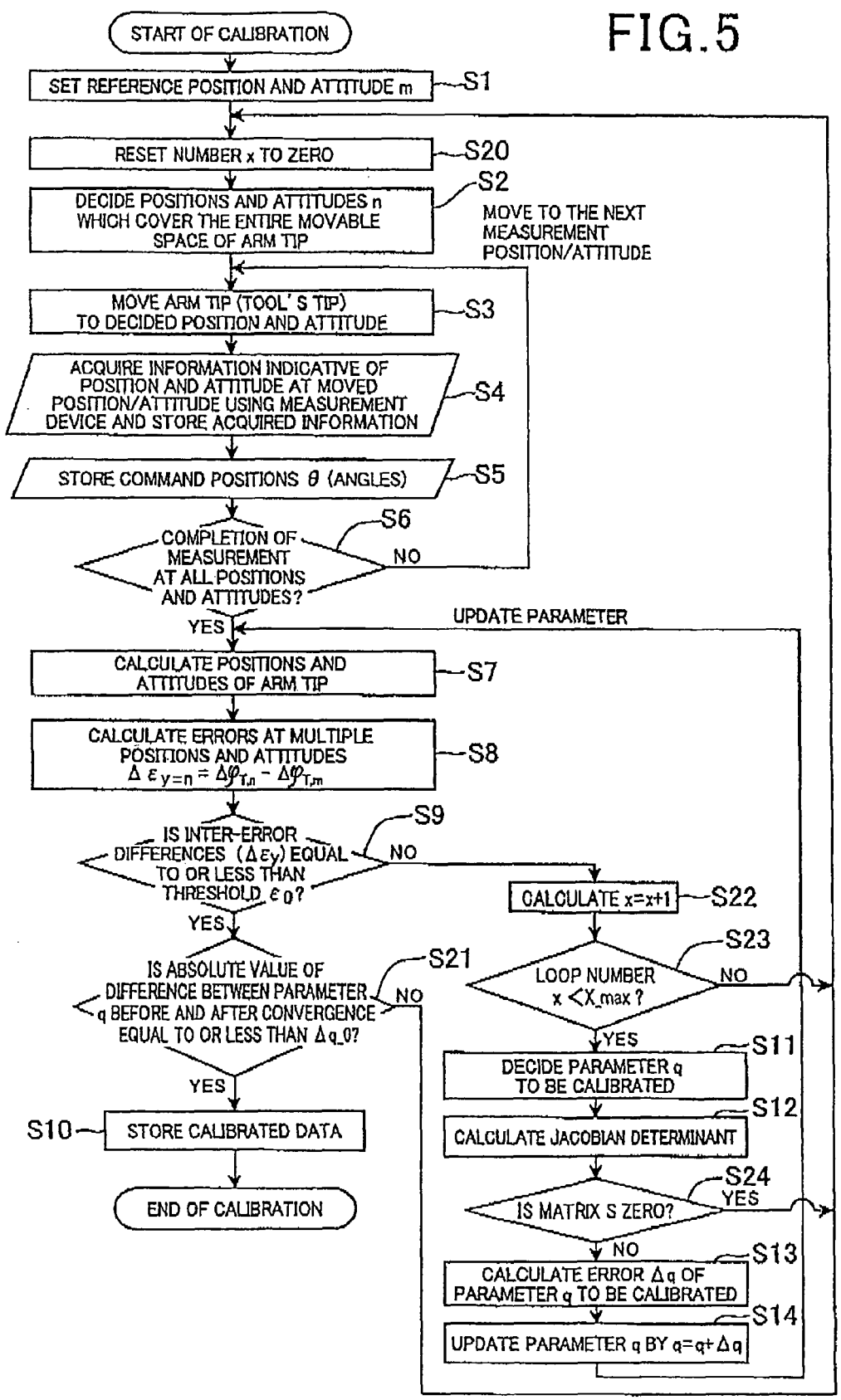
FIG. 5 is a flowchart showing the process for calibration performed by the control computer, which process is according to a third embodiment of the present invention.

Referring to FIG. 5, a third embodiment of the present invention will now be described.

The calibration apparatus according to the third embodiment improvise that according to the first embodiment in selecting the positions and attitudes in the arm's movable space.

In this respect, the first embodiment has been described on condition that, at step S2 in FIG. 3, the positions and attitudes for calibration are selected properly, with almost no bias of selected position within the arm's movable space. This means that the simulated inverse matrix of a Jacobian determinant can be obtained reliably.

However, although it is rare, it may happen that the positions and attitudes are selected from only a specific part of the movable space or are erroneously selected partly or entirely from the same positions. In such cases, the simulated inverse matrix of a Jacobian determinant may not be obtained. Such an undesired situation is covered by the third embodiment.

If the stimulated inverse matrix of a Jacobian determinant J is not obtained, it is assumed that the following three events (a) to (c) have occurred.

(a) In the formula (12) for calculating the error matrix $\Delta q$, the absolute value of the first and second terms in the right-hand side becomes zero. In other words, the matrix S in the following formula (22) becomes zero.

$$S = \begin{Vmatrix} J_{q,1}(\theta, q) - J_{q,m}(\theta, q) \\ \vdots \\ J_{q,n}(\theta, q) - J_{q,m}(\theta, q) \end{Vmatrix}^t \begin{Vmatrix} J_{q,1}(\theta, q) - J_{q,m}(\theta, q) \\ \vdots \\ J_{q,n}(\theta, q) - J_{q,m}(\theta, q) \end{Vmatrix} \quad (22)$$

(b) The absolute value of a difference between a finally estimated parameter matrix q and the parameter matrix q before the final estimation becomes larger than a user's setting threshold $\Delta q\_0$.

(c) The sum of the errors, $\Delta\epsilon_{all}$, does not converge to an amount equal to or less than the threshold $\epsilon 0$ during a period of time corresponding to a maximum loop-processing (repetition) count X_max specified by a user.

When any one of the events (a) to (c) happens, the positions and attitudes once selected at step S2 will be subjected to re-selection and re-calculation processes.

Such steps S20 to S24 for the re-selection and re-calculation processes are added to a flowchart shown in FIG. 5, which is identical to the flowchart shown in FIG. 3 except for such added steps S20 to S24.

Concretely, step S20 intervenes between steps S1 and S2 such that a counter x to count the number of times of loop processing (repetition) is reset at step S20. Further, between steps S9 and S10, a step S21 is placed to determine whether or not the absolute value of a difference between a finally estimated parameter matrix q and the parameter matrix q before the final estimation becomes equal to or less than a user's setting threshold $\Delta q\_0$, which is directed to the event (b). The affirmative (YES) determination at step S20 allows the processing to proceed to step S10, but the negative (NO) determination thereat makes the processing return to step S20.

When the determination at step S9 in FIG. 5 is NO, the processing proceeds to step S22 intervening, together with step S23, between steps S9 and S11. At step S22, the counter x is incremented, and at step S23, the number of times of loop processing is still within the maximum loop-processing count X_max, which is directed to the foregoing event (c). When the determination at step S23 is YES, the next step S11 is subjected to processing, while the determination of NO thereat makes the processing return to step S20.

Moreover, the calculation of a Jacobian determinant J at step S12 is followed by step S24 intervening between steps S12 and S13. Step S24 is placed for the foregoing event (a), so that at step S24, the matrix S is calculated based on the formula (22) and it is determined whether or not the matrix S is zero. The determination NO (S is not zero) at step S24 makes the processing proceed to step S13, while the determination YES (S is zero) thereat makes the processing return to step S20.

As a result of the processing shown in FIG. 5, the foregoing events (a) to (c) can be avoided, thereby always providing the simulated inverse matrix of a Jacobian determinant. In consequence, the calibration can be performed regardless of how the positions and attitudes are selected within the arm's movable space, leading to more reliable calibration.

Incidentally, the processing of the third embodiment, that is, the flowchart of FIG. 5 may be modified based on the processing described in the second embodiment. In such a modification, when the determination at steps S21, S23 and S24 is NO, the processing is returned to step S1 to re-select the reference positions and attitudes m.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

For example, the type of the robot according to the present invention will not be limited to the six-axis vertical articulated type of robot, but may be any other types of robots as long as they comprises an arm that holds a tool.

In addition the objective parameters being calibrated are not limited to both positions and attitudes of the arm tip of a robot, but may be only the positions as described in the foregoing Japanese Patent Laid-open Publication No. HEI 7-68480. In this case, the number n can be set to a value larger than "the number of unknown parameters/3".

What is claimed is:

1. A method of positionally calibrating a tip of an arm of a manipulated type of robot by using a computer, the arm tip being defined as a tip of a tool held by the arm, comprising steps of:
calculating with the computer, at a plurality of positions at which the arm tip is moved, n pieces of errors ($\Delta\phi$: $\Delta\phi_1$, $\Delta\phi_2$, ..., $\Delta\phi_n$, wherein n is a natural number larger than a value obtained by dividing the number of unknown parameters by 6), respectively, each of the errors being an error between a position of the arm tip measured by a measurement device and a position commanded by control at each of the plurality of positions;
calculating an inter-error difference ($\Delta\epsilon_y$ ($1 \leq y \leq n-1$)) between a given reference error ($\Delta\phi_m$ ($1 \leq m \leq n$)) arbitrarily selected from the n-piece errors ($\Delta\phi$) and other errors ($\Delta\phi_x$ ($x \leq n$, except for m)) left other than the given reference error ($\Delta\phi_m$) among the n-piece errors; and
making a parameter, which is a basis for calculating the inter-error differences ($\Delta\epsilon_y$), converge until a sum of absolute values of the respective inter-error differences ($\Delta\epsilon_y$) becomes equal to or less than a given threshold ($\epsilon_0$($\epsilon_0 > 0$)),
wherein the converging step further includes steps of:
calculating a Jacobian determinant (J) for parameter matrices (q, θ), wherein (q) is a matrix of the parameters and θ is a matrix of angles of respective axes of the arm,
calculating an error matrix ($\Delta q$) of the parameter matrix q based on a product of an inter-error difference ($\Delta\epsilon_y$) and a simulated inverse matrix of the Jacobian determinant (J),
updating the parameter matrix (q) by adding the error matrix ($\Delta q$) to the parameter matrix (q), and
re-calculating the position of the arm tip depending on the updated parameter matrix (q), so that the parameter matrix (q) is made to converge so as to calibrate the position of the arm tip.

2. The method of claim 1, wherein the position of the arm tip includes a spatial position and an attitude of the arm tip, and
the plurality of positions (n) includes a plurality of spatial positions and attitudes (n), wherein n is a natural number larger than a value obtained by dividing the number of unknown parameters by 3.

3. The method of claim 2, wherein the inter-error difference calculating step calculates the inter-error difference ($\Delta\epsilon_y$) based on the following formula:

$$\Delta\epsilon_y = (T_{mea,x} - T_{mea,m}) - \begin{bmatrix} {}^{mb}R_{rb}({}^{mb}R_{rb,x} - {}^{mb}R_{rb,m}) & {}^{mb}R_{rb}({}^{mb}P_{rb,x} - {}^{mb}P_{rb,m}) \\ 0 & 0 \end{bmatrix} \times {}^{fl}T_{tool}$$

wherein
$T_{mea,x}$ is a homogeneous transformation matrix representing a vector from a position of the measurement device, which vector is measured by the measurement device and is expressed depending on the number x;
$T_{mea,m}$ is a homogeneous transformation matrix representing a vector from a position of the measurement device, which vector is measured by the measurement device and is expressed depending on the number m;
${}^{fl}T_{tool}$ is a homogeneous transformation matrix representing a vector from a flange of the arm to the tip of the tool, which vector is measured by the measurement device;
${}^{mb}R_{rb}$ is a matrix representing a normal vector, an orientation vector, and an approach vector from the position of the measurement device to a base of the arm, the vectors being calculated;
${}^{mb}R_{rb,x}$ is a matrix expressed depending on the number x;
${}^{mb}R_{rb,m}$ is a matrix expressed depending on the number m;
${}^{mb}P_{rb,x}$ is a matrix representing a vector from the position of the measurement device to the base of the arm, which vector is calculated depending on the number x; and
${}^{mb}P_{rb,m}$ is a matrix representing a vector from the position of the measurement device to the base of the arm, which vector is calculated depending on the number m.

4. A method of positionally calibrating a tip of an arm of a manipulated type of robot by using a computer, the arm tip being defined as a tip of a tool held by the arm, comprising steps of:
calculating with the computer, at a plurality of positions at which the arm tip is moved, n pieces of errors ($\Delta\phi$: $\Delta\phi_1$, $\Delta\phi_1$, $\Delta\phi_2$, ..., $\Delta\phi_n$, wherein n is a natural number larger than a value obtained by dividing the number of unknown parameters by 6), respectively, each of the errors being an error between a position of the arm tip measured by a measurement device and a position commanded by control at each of the plurality of positions;
calculating an inter-error difference ($\Delta\epsilon_y$ ($1 \leq y \leq n-1$)) between a given reference error ($\Delta\phi_m$ ($1 \leq m \leq n$)) arbitrarily selected from the n-piece errors ($\Delta\phi$) and other errors ($\Delta\phi_x$ ($x \leq n$, except for m)) left other than the given reference error ($\Delta\phi_m$) among the n-piece errors; and
making a parameter, which is a basis for calculating the inter-error differences ($\Delta\epsilon_y$), converge until a sum of absolute values of the respective inter-error differences ($\Delta\epsilon_y$) becomes equal to or less than a given threshold ($\epsilon_0$($\epsilon_0 > 0$)),
wherein the converging step further includes steps of:
calculating a Jacobian determinant (J) for parameter matrices (q, θ), wherein (q) is a matrix of the parameters and θ is a matrix of angles of respective axes of the arm,
calculating an error matrix ($\Delta q$) of the parameter matrix q based on a product of an inter-error difference ($\Delta\epsilon_y$) and a simulated inverse matrix of the Jacobian determinant (J),
updating the parameter matrix (q) by adding the error matrix ($\Delta q$) to the parameter matrix (q), and
re-calculating the position of the arm tip depending on the updated parameter matrix (q), so that the parameter matrix (q) is made to converge so as to calibrate the position of the arm tip,
wherein the given reference error ($\Delta\phi_m$) is composed of a plurality of reference errors which are set at a plurality of positions among the positions (n),
the inter-error differences ($\Delta\epsilon_y$), the Jacobian dominant J, and the error matrix ($D_q$) are calculated as for each of the plurality of reference errors, and
the parameter which is a basis for calculating each of the inter-error differences ($\Delta\epsilon_y$) is made to converge until a sum of absolute values of the respective inter-error differences ($\Delta\epsilon_y$) at the difference reference errors ($\Delta\phi_m$) becomes equal to or less than a given threshold ($\epsilon_1$ ($\epsilon_1 > 0$)),
wherein the position of the arm tip includes a spatial position and an attitude of the arm tip, and the plurality of positions (n) includes a plurality of spatial positions and attitudes (n).

5. The method of claim 2, wherein the inter-error difference calculating step calculates the inter-error difference ($\Delta\epsilon_y$) based on the following formula:

$$\Delta\varepsilon_y = (T_{mea,x} - T_{mea,m}) - \begin{bmatrix} {}^{mb}R_{rb}({}^{mb}R_{rb,x} - {}^{mb}R_{rb,m}) & {}^{mb}R_{rb}({}^{mb}P_{rb,x} - {}^{mb}P_{rb,m}) \\ 0 & 0 \end{bmatrix} \times {}^{fl}T_{tool}$$

wherein $T_{mea,x}$ is a homogeneous transformation matrix representing a vector from a position of the measurement device, which vector is measured by the measurement device and is expressed depending on the number x;

$T_{mea,m}$ is a homogeneous transformation matrix representing a vector from a position of the measurement device, which vector is measured by the measurement device and is expressed depending on the number m;

${}^{fl}T_{tool}$ is a homogeneous transformation matrix representing a vector from a flange of the arm to the tip of the tool, which vector is measured by the measurement device;

${}^{mb}R_{rb}$ is a matrix representing a normal vector, an orientation vector, and an approach vector from the position of the measurement device to a base of the arm, the vectors being calculated;

${}^{mb}R_{rb,x}$ is a matrix expressed depending on the number x;

${}^{mb}R_{rb,m}$ is a matrix expressed depending on the number m;

${}^{mb}P_{rb,x}$ is a matrix representing a vector from the position of the measurement device to the base of the arm, which vector is calculated depending on the number x; and ${}^{mb}P_{rb,m}$ is a matrix representing a vector from the position of the measurement device to the base of the arm, which vector is calculated depending on the number m.

6. An apparatus for calibrating of a position of a tip of an arm of a manipulated type of robot, the arm tip being defined as a tip of a tool held by the arm, comprising:

an arm control unit that controls the arm to move to a plurality of positions (n);

an error calculating unit that calculates, at the plurality of positions, n-piece errors ($\Delta\phi$: $\Delta\phi_1$, $\Delta\phi_2$, . . . , $\Delta\phi_n$, wherein n is a natural number larger than a value obtained by dividing the number of unknown parameters by 6), respectively, each of the errors being an error between a position of the arm tip measured by a measurement device and a position commanded by control at each of the plurality of positions;

an inter-error difference calculating unit that calculates an inter-error difference ($\Delta\phi_y$ ($1 \leq y \leq n-1$)) between a given reference error ($\Delta\phi_m$ ($1 \leq m \leq n$)) arbitrarily selected from the n-piece errors ($\Delta\phi$) and other errors ($\Delta\phi_x$ ($x \leq n$, except for m)) other than the given reference error ($\Delta\phi_m$) among the n-piece errors; and a converging unit that makes a parameter, which is a basis for calibrating the inter-error differences ($\Delta\epsilon_y$), converge until a sum of absolute values of the respective inter-error differences ($\Delta\epsilon_y$) becomes equal to or less than a given threshold ($\epsilon_0$ ($\epsilon_0 > 0$)), wherein the converging unit comprises a Jacobian determinant calculating unit that calculates a Jacobian determinant (J) for parameter matrices (q, θ), wherein (q) is a matrix of the parameters and θ is a matrix of angles of respective axes of the arm, an error matrix calculating unit that calculates an error matrix ($\Delta q$) of the parameter matrix q based on a product of an inter-error difference ($\Delta\epsilon_y$) and a simulated inverse matrix of the Jacobian determinant (J), an updating unit that updates the parameter matrix (q) by adding the error matrix ($\Delta q$) to the parameter matrix (q), and a re-calculating unit that re-calculates the position of the arm tip depending on the updated parameter matrix (q), so that the parameter matrix (q) is made to converge so as to calibrate the position of the arm tip, wherein the position of the arm tip includes a spatial position and an attitude of the arm tip, and the plurality of positions (n) includes a plurality of spatial positions and attitudes (n).

7. The apparatus of claim 6, wherein the given reference error ($\Delta\phi_m$) is composed of a plurality of reference errors which are set at a plurality of positions among the positions (n), the inter-error differences ($\Delta\epsilon_y$), the Jacobian dominant J, and the error matrix ($\Delta q$) are calculated as for each of the plurality of reference errors, and the parameter which is a basis for calculating each of the inter-error differences ($\Delta\epsilon_y$) is made to converge until a sum of absolute values of the respective inter-error differences ($\Delta\epsilon_y$) at the difference reference errors ($\Delta\phi_m$) becomes equal to or less than a given threshold ($\epsilon_1$ ($\epsilon_1 > 0$)).

8. The apparatus of claim 7, wherein the inter-error difference calculating means calculates the inter-error difference ($\Delta\epsilon_y$) based on the following formula:

$$\Delta\varepsilon_y = (T_{mea,x} - T_{mea,m}) - \begin{bmatrix} {}^{mb}R_{rb}({}^{mb}R_{rb,x} - {}^{mb}R_{rb,m}) & {}^{mb}R_{rb}({}^{mb}P_{rb,x} - {}^{mb}P_{rb,m}) \\ 0 & 0 \end{bmatrix} \times {}^{fl}T_{tool}$$

wherein $T_{mea,x}$ is a homogeneous transformation matrix representing a vector from a position of the measurement device, which vector is measured by the measurement device and is expressed depending on the number x;

$T_{mea,m}$ is a homogeneous transformation matrix representing a vector from a position of the measurement device, which vector is measured by the measurement device and is expressed depending on the number m;

${}^{fl}T_{tool}$ is a homogeneous transformation matrix representing a vector from a flange of the arm to the tip of the tool, which vector is measured by the measurement device;

${}^{mb}R_{rb}$ is a matrix representing a normal vector, an orientation vector, and an approach vector from the position of the measurement device to a base of the arm, which vectors are calculated;

${}^{mb}R_{rb,x}$ is a matrix expressed depending on the number x;

${}^{mb}R_{rb,m}$ is a matrix expressed depending on the number m;

${}^{mb}P_{rb,x}$ is a matrix representing a vector from the position of the measurement device to the base of the arm, which vector is calculated depending on the number x; and ${}^{mb}P_{rb,m}$ is a matrix representing a vector from the position of the measurement device to the base of the arm, which vector is calculated depending on the number m.

* * * * *

UNITED STATES PATENT AND TRADEMARK OFFICE
CERTIFICATE OF CORRECTION

| | |
|---|---|
| PATENT NO. | : 8,369,993 B2 |
| APPLICATION NO. | : 12/654412 |
| DATED | : February 5, 2013 |
| INVENTOR(S) | : Naoya Kagawa et al. |

It is certified that error appears in the above-identified patent and that said Letters Patent is hereby corrected as shown below:

In the Claims:

Column 15, claim 3, line 51, change "claim 2" to --claim 4--.

Column 16, claim 4, line 18, change "A method of positionally calibrating" to --A method of calibrating--.

Column 16, claim 4, line 22, change "positions at" to --positions to each of--.

Column 16, claim 4, line 40, change "wherein the converging step further includes" to --wherein the step of making the parameter converge further includes--.

Signed and Sealed this
Eighteenth Day of June, 2013

Teresa Stanek Rea
*Acting Director of the United States Patent and Trademark Office*